UNITED STATES PATENT OFFICE.

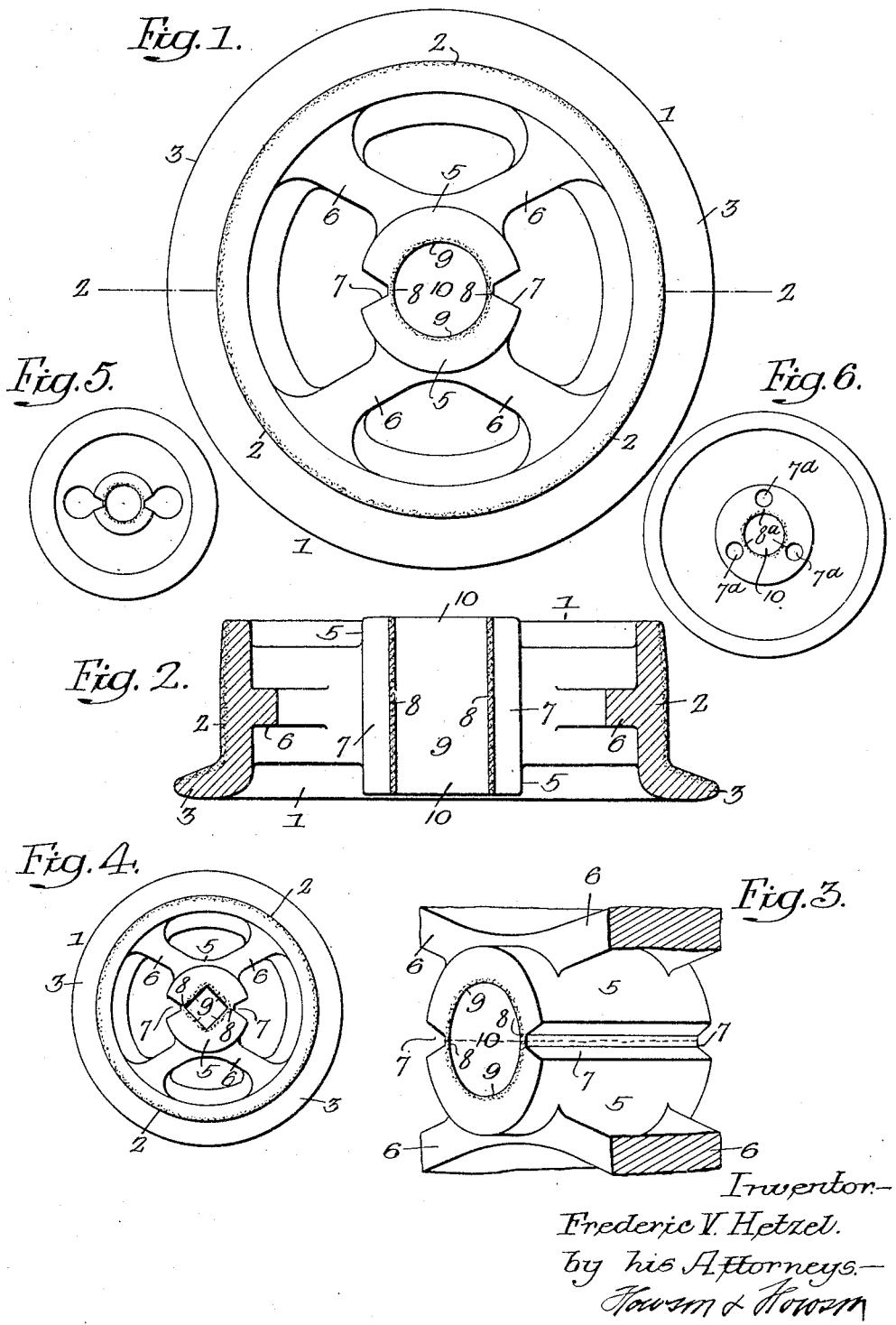

FREDERIC V. HETZEL, OF WEST CHESTER, PENNSYLVANIA, ASSIGNOR TO LINK-BELT COMPANY, OF CHICAGO, ILLINOIS, A CORPORATION OF ILLINOIS.

PROCESS OF MANUFACTURING WHEELS, ROLLERS, AND LIKE MACHINE PARTS.

1,331,259.   Specification of Letters Patent.   Patented Feb. 17, 1920.

Original application filed January 11, 1919, Serial No. 270,696. Divided and this application filed August 13, 1919. Serial No. 317,194.

*To all whom it may concern:*

Be it known that I, FREDERIC V. HETZEL, a citizen of the United States, and a resident of West Chester, county of Chester, State of Pennsylvania, formerly of Indianapolis, Indiana, have invented certain Improvements in Processes of Manufacturing Wheels, Rollers, and like Machine Parts, of which the following is a specification.

My invention relates to certain improvements in the process of manufacturing wheels, rollers, and like machine parts, in which there is a rim having a chilled surface and a hub also having a chilled surface.

One object of my invention is to design the roller, or other element, so that the chill mandrel for the hub can be readily withdrawn, leaving an opening with parallel sides.

A further object of the invention is to make a roller, or other machine element, having a chilled periphery and a chilled hub, in which the bore can be made of an even diameter throughout.

In the accompanying drawings:

Figure 1 is a side view of a roller made in accordance with my improved process;

Fig. 2 is a sectional view on the line 2—2, Fig. 1;

Fig. 3 is a perspective view of the hub, showing a crack made therein, due to the breakage of the parts; and Figs. 4, 5, and 6 are views illustrating modified forms of rollers.

1 is a roller adapted to travel on a track and arranged, in the present instance, to support a conveyer, or other chain. This roller has a rim 2 and a flange 3. The surface of the flange, as well as part of the rim, is chilled in the ordinary manner. 5 is a hub and 6—6 are spokes extending from the rim to the hub. These spokes may be made in any suitable manner. Each side of the hub is recessed in the present instance, as at 7, leaving a comparatively narrow web 8. The internal surface 9 of the hub is chilled and the opening 10, formed in the hub, is of an even diameter throughout.

In ordinary practice, if a chill mandrel, of an even diameter throughout, be used, it is impossible to withdraw the mandrel from the hub without destroying it, owing to the shrinkage of the parts onto the mandrel. In some instances, the opening may be made by providing the mandrel with a considerable taper. This is objectionable, as it is difficult and expensive to grind or bore the chilled hub so as to provide an opening of an even diameter to allow the roller to rotate freely on a pin.

I have found that by making the recesses in the hub, as at 7, which reduce the inner wall at one or more points to a mere shell, that when the roller, or other machine element, cools, it will crack the web or webs 8 and this cracking, or parting of the hub, allows for the withdrawal of the mandrel. The cracking of the hub does not materially reduce the strength of the roller, nor does it interfere with its travel on the spindle, or pivot pin. The result is that I obtain a true hardened bearing.

By making the roller, as indicated in Fig. 1, where the hub is made in two sections connected together by narrow webs, and by arranging substantial spokes to support each section, the strength of the roller is not impaired to any appreciable extent and its life is prolonged, due to the chilled surface at the hub as well as at the periphery.

While I have shown in Fig. 1 a cylindrical opening in the hub, the opening may be rectangular, as in Fig. 4. In some instances a single slot may be made to form one weak spot, or more than two slots may be made, if desired, depending upon the size and character of the hub.

While I have shown a roller having a chilled rim and a chilled hub, the chilled rim may be dispensed with in some instances but it is highly desirable to make this hub in the manner shown where there is a chilled rim, as the rim has a tendency to shrink and, as its surface is more extended than that of the hub, it tends to contract the hub and bind the chill mandrel therein.

Instead of the spokes, a plate may be used to connect the rim and the hub, as shown in Fig 5, and the wall may be made with a single or double plate, as desired.

In Fig. 6, I have shown the hub having three perforations 7ª, which form the webs 8ª in the hub. These may be formed by cores in the ordinary manner so that when the roller, or other element, cools, the hub will be cracked at these points, and the chill mandrel can be readily withdrawn.

It will be seen by my improved process that I am enabled to make a roller, or other element, having a rim and a hub, in which the periphery of the rim is chilled, as well as the wall of the pivot pin opening in the hub.

This application for patent is a division of the application filed by me on the 11th day of January, 1919, Serial No. 270,696.

I claim:

1. The process herein described of making a roller, or other machine element having a rim and a hub, the hub having an opening therein, the walls of the opening in the hub being chilled, said process consisting in first making a mold to produce a roller, or other machine element having an integral rim and a hub, the hub having a weak portion, then placing a chill mandrel in the mold to form the opening in the hub, then casting the element and allowing it to cool and the hub to crack at the weak point while the rim remains intact, then withdrawing the chill mandrel.

2. The process herein described of making a chilled roller, or other machine element, having a chilled periphery and a hub chilled around the opening therein, said process consisting in casting the element in a mold in which the thickness of the hub is reduced at one or more points and having a chill for chilling the periphery, and a chill mandrel of an even diameter throughout for chilling the wall of the opening, then pouring the metal in the mold and allowing it to cool and crack at the hub so that the chill member can be withdrawn.

FREDERIC V. HETZEL.